United States Patent [19] [11] 3,844,635
Atkins [45] Oct. 29, 1974

[54] RETRO-REFLECTORS
[75] Inventor: Francis James Atkins, Rugby, England
[73] Assignee: Associated Engineering Limited, Leamington Spa, Warwickshire, England
[22] Filed: Apr. 12, 1973
[21] Appl. No.: 350,624

[30] Foreign Application Priority Data
Apr. 14, 1972 Great Britain.................... 17472/72

[52] U.S. Cl.................. 350/104, 350/97, 350/288, 350/293
[51] Int. Cl. ............................................ G02b 5/12
[58] Field of Search ............ 350/97, 102, 104, 106, 350/105, 199, 288, 293

[56] References Cited
UNITED STATES PATENTS
1,872,643   8/1932   Bone................................... 350/104
2,951,419   9/1960   Lemelson............................ 350/106
3,353,897   11/1967  Lemelson............................ 350/106
3,374,044   3/1968   Benson .............................. 350/102
3,604,785   9/1971   Travis ................................ 350/199
3,658,408   4/1972   Santovi ............................... 350/97

Primary Examiner—Ronald L. Wibert
Assistant Examiner—Michael J. Tokar
Attorney, Agent, or Firm—Brisebois & Kruger

[57] ABSTRACT

A retro-reflector includes means at least substantially to focus a substantially parallel beam of light from a source of light onto and substantially at right angles to a surface of the retro-reflector when there is relative motion between said source and the retro-reflector along a line which is inclined to a straight line between said source and the retro-reflector, said surface having alternating bands of greater and lesser reflectivity to modify the reflected light repetitively during said relative motion when said at least substantially focussed beam of light traverses said bands.

10 Claims, 5 Drawing Figures

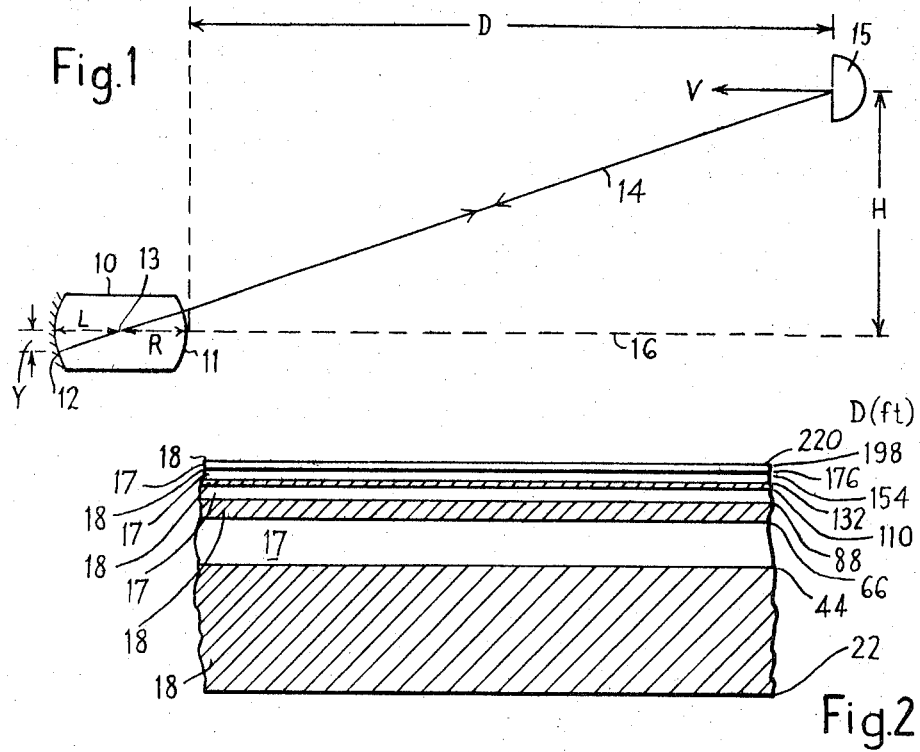
Fig.1
Fig.2
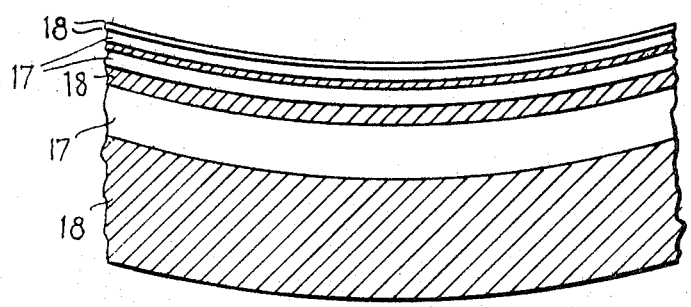
Fig.3
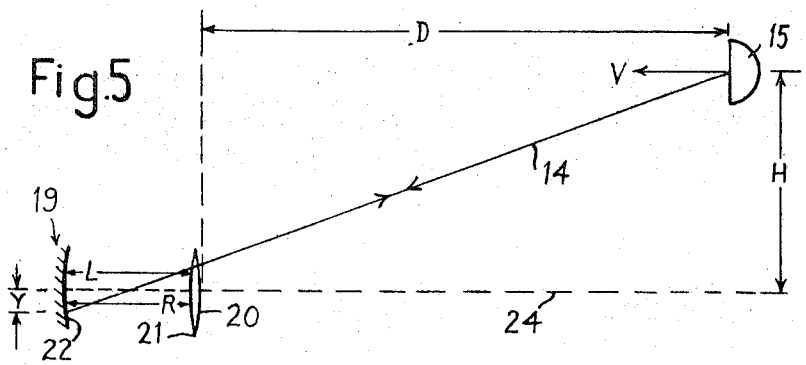
Fig.5

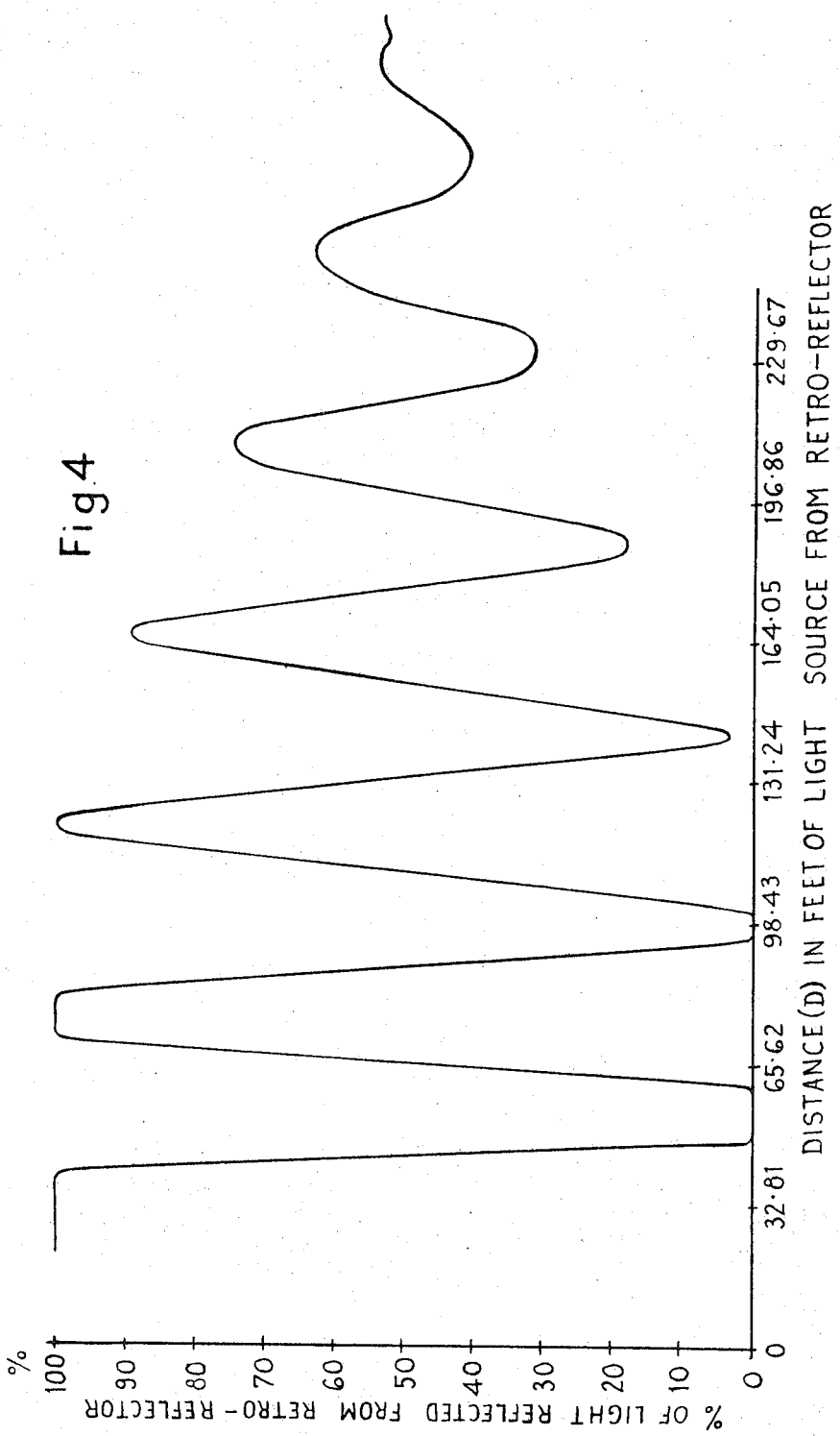

3,844,635

RETRO-REFLECTORS

This invention relates to retro-reflectors, that is reflectors which reflect incident light in a direction along or substantially parallel to the path of the incident light.

The invention consists in a retro-reflector including means to modify the reflected light repetitively when there is relative motion between a source of light shining on the retro-reflector and the retro-reflector, the relative motion being along a line which is inclined to a straight line between the source and the retro-reflector, said retro-reflector including means at least substantially to focus a substantially parallel beam of light from said source onto a surface of said retro-reflector and substantially at right angles to said surface, said surface having alternating bands of greater and lesser reflectivity, and said bands progressively increasing in width in a direction from the optical axis of said retro-reflector towards the boundary of said surface which bands are traversed by the at least substantially focussed beam of light during said relative motion.

In this specification the words "bands of lesser reflectivity" include within their ambit bands having zero reflectivity, i.e., bands which totally absorb the incident light so as to interrupt the reflected light and bands which partially absorb the incident light or produce a sinusoidal variation of the amplitude of the reflected light to modulate the reflected light.

The bands may be so formed and arranged that the repetition rate of the light modification is constant with decreasing distance between the source and the retro-reflector, when the speed of relative motion is constant.

Conveniently, the repetition rate increases with decreasing distance between the source and the retro-reflector, when the speed of the relative motion is constant.

Alternatively the repetition rate is independent of distance but increases with increase in speed.

The retro-reflector may include a transparent member having a convex front face on which said at least substantially parallel beam of light from said source impinges, and a convex rear face which affords said surface, the centres of curvature of said front and rear faces of said transparent member being adjacent but slightly separated whereby said reflected beam returning towards said light source is slightly divergent.

The member may be a solid block of glass or transparent plastics material such as a cylinder having convex end faces.

Alternatively, the retro-reflector may include a transparent member including a double convex lens for example of glass or transparent plastics material and a separate member provided with a curved face which affords said surface, said curved face having a radius of curvature substantially equal to the focal length of the lens and being spaced from the lens by a distance substantially equal to the focal length of the lens.

The invention is described, by way of example only, with reference to the accompanying drawings in which:

FIG. 1 is a diagrammatic illustration in elevation showing one embodiment and the manner in which it operates, FIG. 2 is an enlarged scrap view of the reflective surface forming part of the embodiment of FIG. 1 and looking from the right to the left of FIG. 1, FIG. 3 is an enlarged scrap view of an alternative form of reflective surface, FIG. 4 is a graph plotting the percentage of incident light reflected from the retro-reflector against the distance of a source of light therefrom, and FIG. 5 is a view similar to that of FIG. 1 and showing an alternative embodiment and its manner of operation, In FIG. 1 a stationary cylindrical glass or transparent plastics member 10 has front and rear part-spherical faces 11 and 12 respectively; the lower generatrix of the member 10 may be in operation at ground level so that the face 11 projects above the ground, the surface of which is in alignment with the optical axis 16 of the member 10. The member 10 may be retractable in the same manner as the conventional "cats-eye" reflector. The faces 11 and 12 are positioned so that their respective radii R and L are struck about a common centre 13. In this way a ray of light 14 from a source of light 15, for example, a vehicle head lamp, which impinges in a normal direction to the front face 11, will pass undeviated therethrough and will pass through the centre 13 to impinge in a normal direction to the rear face 12. If that part of the rear face 12 is provided with a reflective surface, the ray 14 will be reflected along the same path, back through the centre 13 and the front face 11, along its path of incidence to the source of light 15. The radii L and R are chosen so that a parallel beam of light incident on the front face 11 is substantially focussed thereby on the rear face 12.

It is preferred that the centres of the radii R and L are separated slightly so that the beam of light returning towards the source of light 15 will be slightly divergent.

It will be seen that if the source of light 15 is moving along a line which is inclined to a line joining the source of light 15 to the glass member 10, the focussed image formed on the rear face 12 of the beam of light from the source 15 will move vertically across the rear face 12. The rear face 12 has alternating horizontal bands of greater and lesser reflectivity to modify (interrupt or modulate) the reflected light repetitively. If the rear face 12 has alternating reflective and non-reflective bands arranged such as indicated at 17 and 18 in FIG. 2, then as the light from the source 15 moves along its path, the beam of light returning towards it will be repetitively interrupted, and will appear to flash to an observer at or adjacent the source 15.

If the source 15 is travelling along a line which is at a height H in feet above the ground surface or optic axis 16 of the member 10, with a speed V. ft. /sec. at a distance D feet away from the member 10, Y is the vertical distance in feet of the point of focus of the beam of light from a line through the centres 13 and parallel to the path of the source 15, then Y/L = H/D (if distance D is very much greater than radius R).

To obtain a constant flashing rate, F per second, the boundaries of the reflective portions of the rear face 12 should be such that reflection starts every V/F feet of travel of the source 15 and stops every V/F feet.

Neglecting lens distortions, the pattern of the reflective surface is a system of horizontal bands of varying widths as shown in FIG. 2. The position of the horizontal edges of the reflective bands of the rear face 12 which result in a constant flashing rate at constant speed V are given by $Y = 2FLH/NV$ where N is an integer.

FIG. 2 shows a vertical strip of the reflective rear surface 12 with the left and right hand edges broken away and at a magnification of 40 X, calculated to give one flash per second at 30 miles per hour for a vehicle having the source 15, such as a vehicle headlamp, at a height H of 2.5 feet above, and travelling on a flat but not necessarily level road, and where $R + L = 0.048$ feet approximately. In this case, the glass member 10 is mounted as a reflector at the road surface. As will be apparent from FIG. 2 the top-most non-reflective band 18 is effective at a distance D of 220 to 198 feet of the light source 15 from the face 11 of the retro-reflector (FIG. 1) to absorb the beam of light focussed by the face 11 onto the face 12. As the distance D decreases the focussed light beam is reflected by the succeeding reflective band 17 from 198 to 176 feet and then alternately absorbed and reflected as it passes successively across the alternating bands 17 and 18 until at D distance of from 44 to 22 feet, the bottom-most non-reflective band 18 totally absorbs the incident light. In FIG. 2 the horizontal edges of the reflective bands 17 are progressively further apart, i.e., the widths of the bands progressively increase in the direction of traverse of the focussed beam of light i.e., in a direction from the optical axis 16 towards the boundary of the surface 12. If the speed of relative motion of the light source 15 increases then the flashing rate will be increased and will be independent of the distance from the retro-reflector. in reflected light for a source of light constituted by a vehicle headlamp of approximately 0.42 feet diameter at a height of 2.50 feet from the surface of a road with a retroreflector such as is shown in FIG. 1 and having the pattern of alternating bands shown in FIG. 2. As will be apparent from the graph both the percentage of the reflected light and the size of the image increases as the distance of the vehicle from the retro-reflector decreases.

In the embodiment of FIG. 5, the retro-reflector is constituted by a thin double convex lens 21 of glass or transparent plastics material and having a front part-spherical face 20 and a separate member 19 having a curved part-spherical face 22. The curved face 22 has a radius of curvature L which is equal or substantially equal to the focal length R of the lens and is spaced from the lens by a distance which is equal or substantially equal to the focal length R of the lens. The optical axis of the lens 21 is indicated at 24 and is in alignment with the ground surface. In this way the ray of light 14 from a source of light 15, for example, a vehicle headlamp which impinges on the front face 20 will pass undeviated therethrough to impinge in a normal direction on the curved face 22. This embodiment functions in the same manner as that of FIG. 1, the curved face 22 being provided with alternating bands of greater and lesser reflectivity as described with reference to FIGS. 1, 2 and 3.

Any suitable materials may be used to form the bands of the faces 12, 22 depending upon the nature and arrangement of the alternating bands. For example the faces 12 and 22 may be alternately silvered and black or of polished metal with slots cut in it to provide reflective bands alternating with non-reflective bands. To modulate the reflected light repetitively, the faces 12 and 22 may be alternately silvered and coloured, the coloured bands partially absorbing the focussed light and reflecting coloured light; the bands may be alternately bright and matt to reflect light of varying intensitities or arranged to provide for sinusoidal variation of amplitude of the reflected light. The reflective bands may merge progressively into non-reflective bands or bands of lesser reflectivity which effect may be achieved by spraying, for example.

FIG. 3 corresponds to FIG. 2 except that the bands 17, 18 and 25, 26 are curved so as to take account of any camber in a road, for example. The bands are concave upwards where the road camber is convex upwards, because the image of the light source will be inverted.

Retro-reflectors having a flashing property can be used in various ways, for example, reflectors having a high flash rate can be used at the approach to severe bends in a road, and reflectors with a lower flash rate at gentle bends. As an additional stimulus to reduce speed at a dangerously severe bend, reflectors can be installed which have an increasing flashing rate as they are approached.

Flashing reflectors can be incorporated into mandatory road signs. It is possible to design reflectors which flash when a vehicle is approaching a sign but give constant reflection when the vehicle is close to it.

By mounting reflectors of the type described above on the rear of a vehicle at a height above normal headlamp height, the reflector will not flash when the vehicle and the following vehicle are travelling at the same speed, but will flash with increasing rapidity as the relative speeds of the vehicles increase, such as when the vehicle having the reflector is stationary.

It will be appreciated that the invention may have many other uses apart from the examples of use described.

Various modifications may be made to the embodiments described, for example, the surfaces 11, 12, and 22 may be part-cylindrical or curved in two planes although not being part-spherical. Furthermore, the faces 12 and 22 may be substantially flat. The member 10 may be a rectangular block of glass or transparent plastics material having partspherical or part-cylindrical end faces.

I claim:

1. A retro-reflector including means to modify the refelected light repetitively when there is relative motion between a source of light shining on the retro-reflector and the retro-reflector, the relative motion being along a line which is inclined to a straight line between the source and the retro-reflector, said retro-reflector including means at least substantially to focus a substantially parallel beam of light from said source onto a surface of said retro-reflector and substantially at right angles to said surface, said surface having alternating bands of greater and lesser reflectivity and said bands progressively increasing in width in a direction from the optical axis of said retro-reflector towards the boundary of said surface, whereby during said relative motion said substantially focussed beam of light traverses said alternating bands which modify repetitively the light reflected from said surface.

2. A retro-reflector as claimed in claim 1 including a transparent member having a convex front face on which said at least substantially parallel beam of light from said source impinges, and having a convex rear face which affords said surface, the centres of curvature of said front and rear faces of said transparent member being adjacent but slightly separated, whereby said reflected beam returning towards said light source is slightly divergent.

3. A retro-reflector as claimed in claim 2, wherein said transparent member is a solid block of transparent material.

4. A retro-reflector as claimed in claim 3, wherein said transparent member is a cylinder having convex end faces.

5. A retro-reflector as claimed in claim 1 including a transparent member including a double convex lens and a separate member provided with a curved face which affords said surface, said curved face having a radius of curvature substantially equal to the focal length of the lens and being spaced from the lens by a distance substantially equal to the focal length of the lens.

6. A retro-reflector as claimed in claim 1, wherein said bands are so formed and arranged that the repetition rate of the light modification is constant with decreasing distance between the source and the retro-reflector, when the speed of relative motion is constant.

7. A retro-reflector as claimed in claim 1, wherein said bands are so formed and arranged that the repetition rate of the light modification increases with decreasing distance between the source and the retro-reflector, when the speed of the relative motion is constant.

8. A retro-reflector as claimed in claim 1, wherein said bands are so formed and arranged that the repetition rate of the light modification is independent of distance but increases with increase in speed.

9. A retro-reflector as claimed in claim 1, wherein the bands are straight.

10. A retro-reflector as claimed in claim 1, wherein the bands are curved.

* * * * *